(12) United States Patent
Jia

(10) Patent No.: US 9,945,594 B2
(45) Date of Patent: Apr. 17, 2018

(54) LARGE CAPACITY DEFROSTING VALVE

(71) Applicant: YANTAI JIAYOU ELECTRICAL MECHANICAL TECHNOLOGY CO., LTD, Yantai (CN)

(72) Inventor: Peiyu Jia, Yantai (CN)

(73) Assignee: YANTAI JIAYOU ELECTRICAL MECHANICAL TECHNOLOGY CO., LTD, Yantai (CN)

(*) Notice: Subject to any disclaimer, the term of this patent is extended or adjusted under 35 U.S.C. 154(b) by 0 days.

(21) Appl. No.: 15/473,566

(22) Filed: Mar. 29, 2017

(65) Prior Publication Data

US 2017/0205126 A1    Jul. 20, 2017

Related U.S. Application Data

(63) Continuation of application No. PCT/CN2015/091146, filed on Sep. 29, 2015.

(30) Foreign Application Priority Data

Sep. 30, 2014    (CN) .......................... 2014 1 0516153

(51) Int. Cl.
  *F16K 31/122* (2006.01)
  *F25B 47/02* (2006.01)
  (Continued)

(52) U.S. Cl.
  CPC .......... *F25B 47/025* (2013.01); *F16K 11/044* (2013.01); *F25B 41/04* (2013.01)

(58) Field of Classification Search
  CPC ...... F16K 11/044; F25B 47/025; F25B 41/04; Y10T 137/2544; Y10T 137/7771; Y10T 137/7772; Y10T 137/7777; Y10T 137/7925; Y10T 137/87193; Y10T 137/87217; Y10T 137/87169
  (Continued)

(56) References Cited

U.S. PATENT DOCUMENTS 2,706,487 A * 4/1955 Wilson .................... B60T 15/42
                                                      137/102
2,828,767 A * 4/1958 Barusch ............. F16K 11/0655
                                                    137/625.29
(Continued)

*Primary Examiner* — Minh Le
(74) *Attorney, Agent, or Firm* — Wayne & King LLC

(57) ABSTRACT

Disclosed in the present invention is a large capacity defrosting valve, comprising a valve body; the upper end of the valve body is connected to an upper end cover; the valve body is provided with a piston therein; the piston is connected to a valve core; the upper end of the valve core is connected to a tension spring; the upper end of the tension spring is connected to the lower end of the upper end cover; the lower end of the valve body is connected to a lower end cover; the valve body is provided with a first channel and a second channel thereon; the lower end cover is provided with a third channel thereon; the upper end cover is provided with a fourth channel thereon; a power cavity is formed between the piston and the upper end cover; and a buffer cavity is formed between the piston and the valve body. The present invention has no impact during operation, and has good stability, high reliability and long service lift, thus greatly improving the heating efficiency of an air-conditioner.

9 Claims, 15 Drawing Sheets

(51) Int. Cl.
*F16K 11/044* (2006.01)
*F25B 41/04* (2006.01)

(58) Field of Classification Search
USPC .. 137/596.17, 102, 596.14, 596.2, 596, 493, 137/493.1, 493.6, 538, 625.43; 62/140, 62/324.6; 236/80 R
See application file for complete search history.

(56) References Cited

U.S. PATENT DOCUMENTS

| | | | | |
|---|---|---|---|---|
| 3,747,626 A * | 7/1973 | Valentino | ............... | F16K 15/18 137/102 |
| 4,057,074 A * | 11/1977 | Fischer | ................. | F16K 11/02 137/107 |
| 4,492,252 A * | 1/1985 | Kanai | ................. | F25B 41/046 137/625.43 |
| 4,644,760 A * | 2/1987 | Aoki | ................. | F25B 41/046 137/625.43 |
| 4,760,709 A * | 8/1988 | Aoki | ................. | F25B 41/046 137/625.43 |
| 4,877,046 A * | 10/1989 | Albrigtsen | ............. | F16K 11/04 137/107 |
| 5,694,965 A * | 12/1997 | Roulet | ................. | G05D 16/10 137/102 |
| 6,619,431 B2 * | 9/2003 | Wilcox | ............... | F16C 33/6625 184/105.3 |
| 6,648,010 B1 * | 11/2003 | Goodwin | ............... | F16K 15/03 137/491 |
| 6,684,651 B1 * | 2/2004 | Yoshizawa | ......... | F16K 11/0655 137/625.43 |
| 6,830,073 B2 * | 12/2004 | Lee | .................... | F15B 13/0406 137/625.43 |
| 7,152,416 B2 * | 12/2006 | Lifson | ................ | F16K 11/0655 62/160 |
| 8,191,376 B2 * | 6/2012 | Fox | ........................ | F25B 13/00 62/174 |
| 8,234,877 B2 * | 8/2012 | Beekman | ........... | F16K 31/1223 251/213 |
| 2011/0088427 A1 * | 4/2011 | Ishii | ................... | F16K 11/0655 62/529 |
| 2016/0061337 A1 * | 3/2016 | Teller | ................. | F02M 37/0064 137/10 |

* cited by examiner

LARGE CAPACITY DEFROSTING VALVE

CROSS-REFERENCE TO RELATED APPLICATIONS

This application is a continuation of International Patent Application No. PCT/CN2015/091146 with an international filing date of Sep. 29, 2015, designating the United States, now pending, and further claims priority benefits to Chinese Patent Application No. 201410516153.1, filed Sep. 30, 2014. The contents of all of the aforementioned applications, including any intervening amendments thereto, are incorporated herein by reference.

TECHNICAL FIELD

The present invention relates to a large capacity defrosting valve, and belongs to the technical field of air-conditioner defrosting. The defrosting valve is used to sectionally defrost an evaporator when an air-conditioner is heating.

BACKGROUND

When an air-conditioner is heating, the evaporator will defrost, and too thick frost will reduce the heating efficiency. Therefore, the evaporator is required to be defrosted. The existing defrosting mode is using a four-way valve to change air flow direction to defrost the evaporator wholly. When in defrost, the condenser becomes an evaporator, and heating is forced to stop thus reducing the heating efficiency of the air-conditioner.

SUMMARY

The present invention aims to overcome the deficiencies of the prior a and provide a large capacity defrosting valve having good structural stability, high reliability, long service life and no leakage danger, thus greatly improving the heating efficiency of an air-conditioner.

The objective of the present invention is achieved by the following measures: a large capacity defrosting valve, comprising a valve body; the upper end of the valve body is connected to an upper end cover; the valve body is provided with a piston therein, the piston is connected to a valve core; the upper end of the valve core is connected to a tension spring; the upper end of the tension spring is connected to the lower end of the upper end cover; the lower end of the valve body is connected to a lower end cover; the valve body is provided with a first channel and a second channel thereon; the lower end cover is provided with a third channel thereon; the upper end cover is provided with a fourth channel thereon; a power cavity is formed between the piston and the upper end cover; and a buffer cavity is formed between the piston and the valve body.

The valve core is provided with a small valve cover at the lower end, and a small valve core therein; the lower part of the small valve core is sleeved with a small spring for jacking up the small valve core; the lower end of the small spring is connected to the small valve cover; and the small valve cover is provided with a channel thereon.

The piston is connected to the valve core via a connecting rod; and the connecting rod is connected to the tension spring.

The piston is provided with a fifth channel thereon.

The valve core is provided with a sixth channel, at the upper end.

The fourth channel is connected to a forcibly open solenoid valve via a pipe; and the forcibly open solenoid valve is connected to the third channel via a pipe.

The second channel is connected to a defrosting solenoid valve.

A sealing gasket is disposed between the valve body and the lower end cover.

Compared to the prior art, the present invention has the following positive effects: the present invention has small impact, good stability, long service life and no leakage danger, and can sectionally defrost an evaporator without stopping heating when in defrost, thus greatly improving the heating efficiency of an air-conditioner.

DETAILED DESCRIPTION OF THE PREFERRED EMBODIMENT

Figure 1:
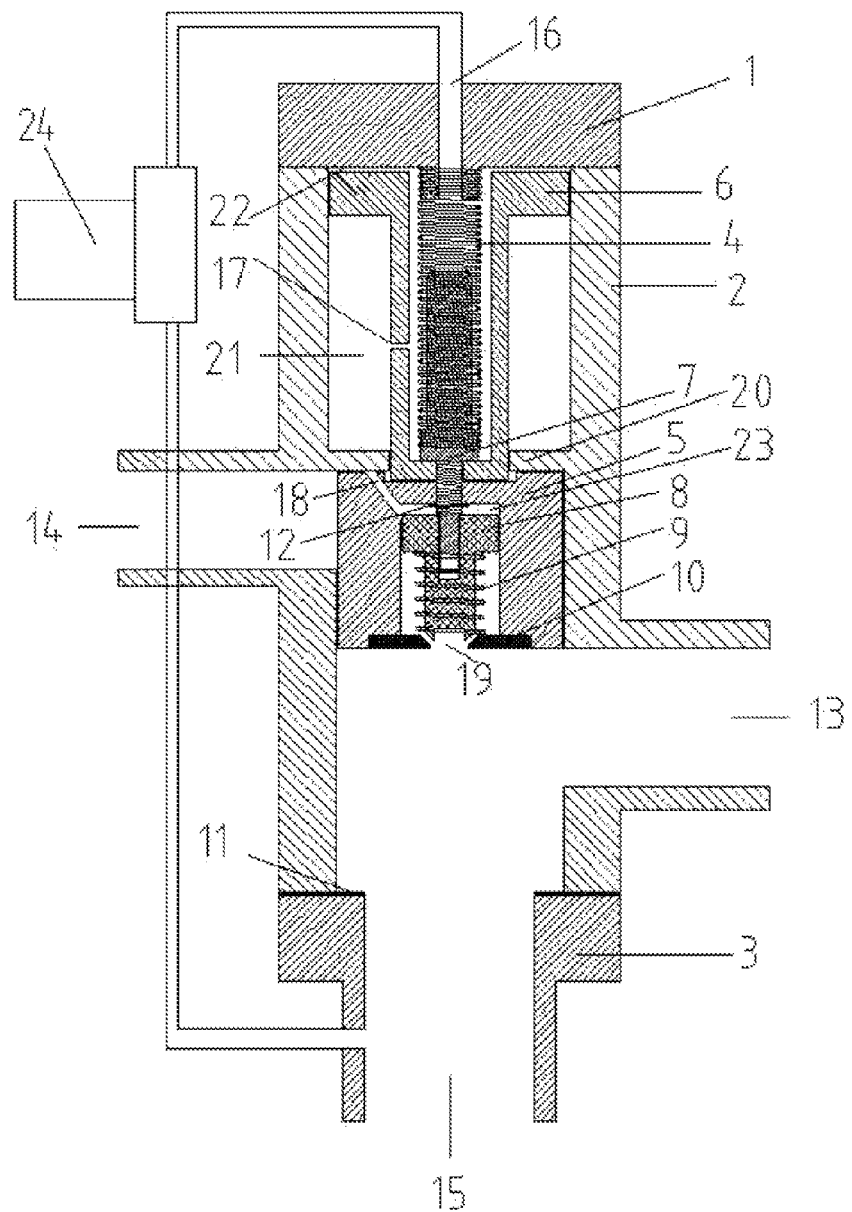
FIG. 1 is a structural schematic diagram of the first embodiment of the present invention.

In order to enable the objective, characteristics and advantages of the present invention to be more obvious and understandable, the preferred embodiments of the present invention will be detailed hereafter in connection with the drawings.

The preferred embodiments of the present invention are detailed in connection with the drawings as follows:

Embodiment 1 a large capacity defrosting valve (see FIG. 1-4), comprising a valve body 2; the upper end of the valve body 2 is connected to an upper end cover 1; the valve body 2 is provided with a piston 6 therein; the piston 6 is connected to a valve core 5 via a connecting rod 7, and is locked by a locking pad 12.

The upper end of the connecting rod 7 is connected to a tension spring 4; the upper end of the tension spring 4 is connected to the lower end of the upper end cover 1. The valve core 5 is provided with, a small valve cover 10 at the lower end, and a small valve core 8 therein; the lower part of the small valve core 8 is sleeved with a small spring 9 for jacking up the small valve core 8; the lower end of the small spring 9 is connected to the small valve cover 10. The lower end of the valve body 2 is connected to a lower end cover 3; a sealing gasket 11 is disposed between the valve body 2 and the lower end cover 3; the valve body 2 is provided with a first channel 13 and a second channel 14 thereon; the lower end cover is provided with a third channel 15 thereon; the upper end cover 1 is provided with a fourth channel 16 thereon; the piston 6 is provided with a fifth channel 17 thereon; the valve core 5 is provided with a sixth channel 18 at the upper end; the small valve cover 10 is provided with a seventh channel 19 thereon. The valve body 2 is provided with an intermediate separator 20 thereon; a buffer cavity 21 is formed between the piston 6, the valve body 2 and the intermediate separator 20; a power cavity 22 is formed between the piston 6 and the upper end cover 1. The fourth channel 16 is connected to a forcibly open solenoid valve 24 via a pipe; and the forcibly open solenoid valve 24 is connected to the third channel 15 via a pipe.

When in use, the first channel 13 is connected to an evaporator; the second channel 14 is connected to a high temperature and pressure air compressor for discharging air; and the third channel 15 is connected to a compressor for returning air.

When in normal operation, the second channel 14 has no high temperature and pressure air therein; the piston 6 and the valve core 5 are pulled to the upper side via the connecting rod 7 under the effect of the tension spring 4; the first channel 13 is communicated with the third channel 15; and the fluid passes through the first channel 13, and flows to the third channel 15. The state at this time is as shown in FIG. 1.

When the high temperature and pressure fluid of the second channel 14 arrives, the air flow flows to a small valve core cavity 23 via the sixth channel 18; and the small valve core 8 moves downwards under the effect of pressure, and is closed by integrating with the small valve cover 10.

Figure 2:
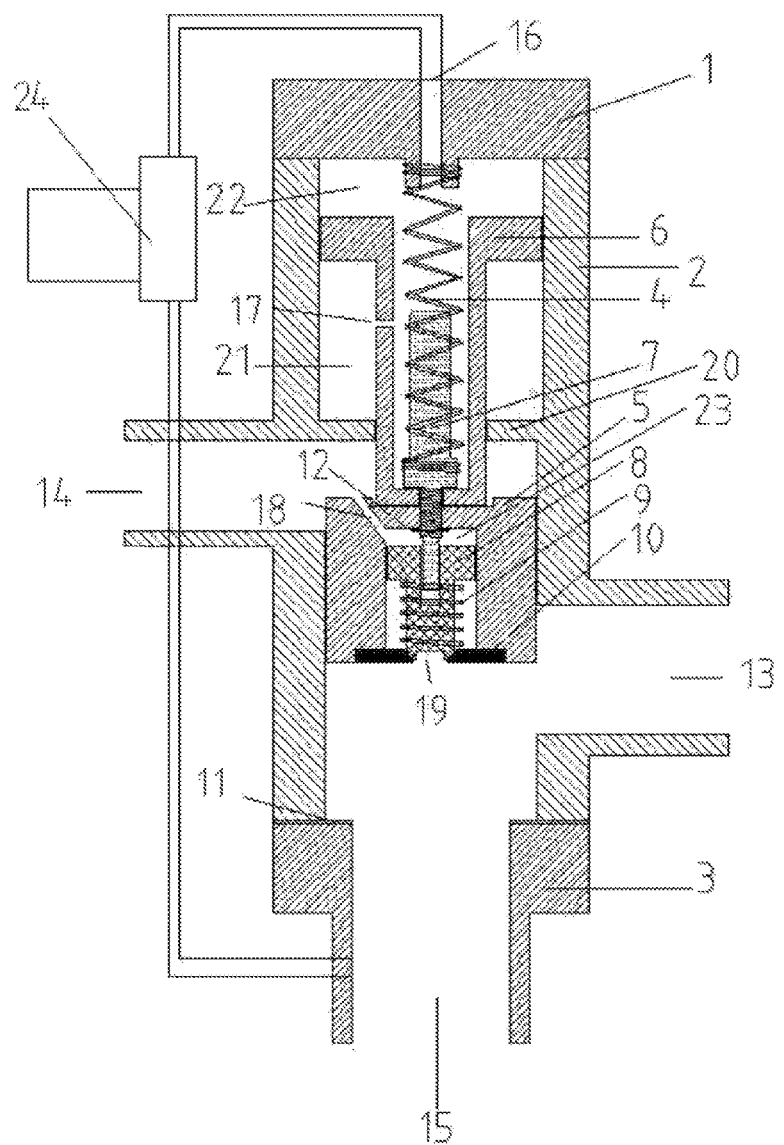
FIG. 2 is a structural schematic diagram when the valve in FIG. 1 just starts to operate.
Figure 3:
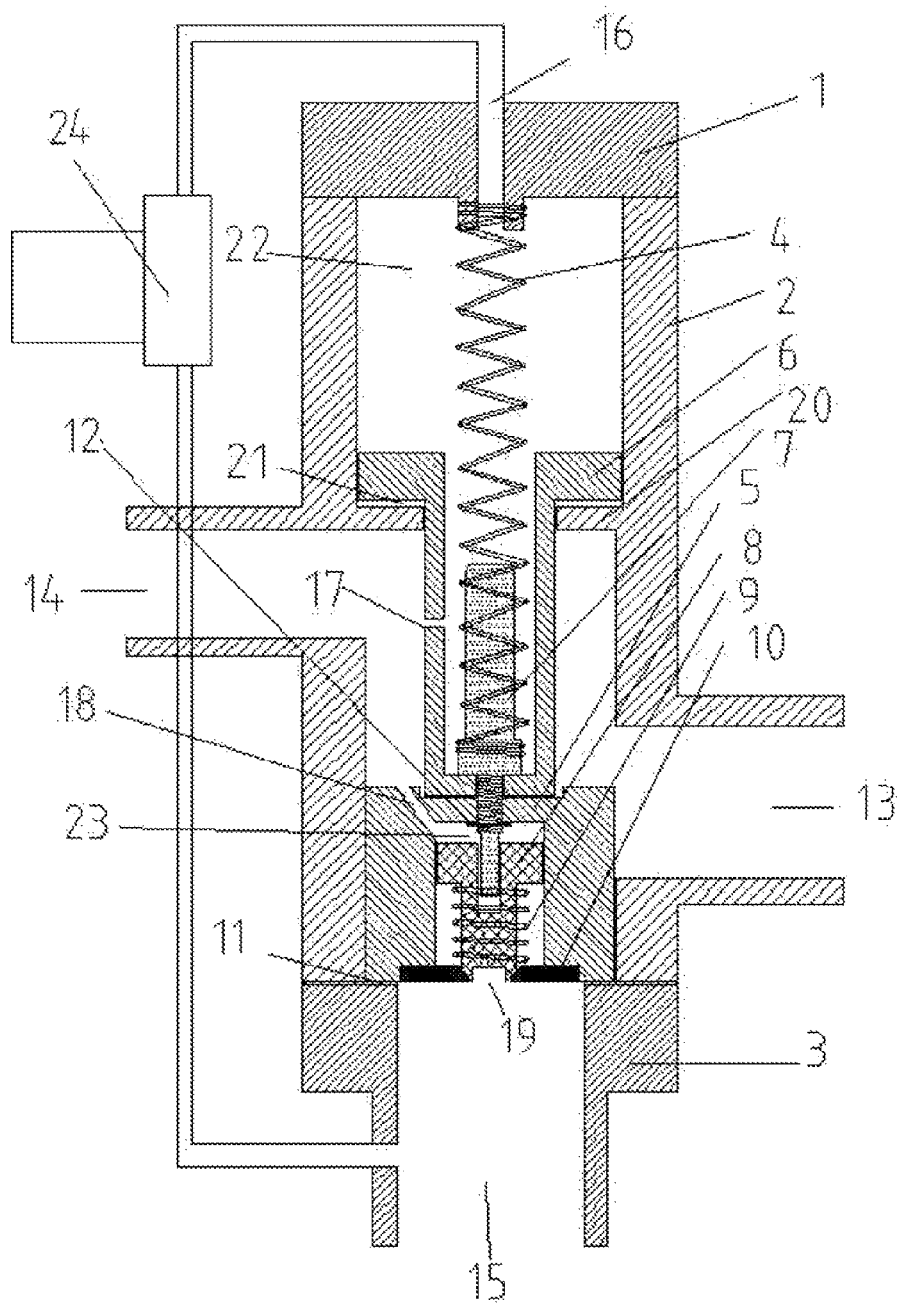
FIG. 3 is a structural schematic diagram after the valve in FIG. 1 completes an operation.

The air flow is further throttled to the buffer cavity 21 via a gap between the piston 6 and the intermediate separator 20; the piston 6 goes upwards under stress to prevent the valve core 5 from moving downwards; after the air flow in the buffer cavity 21 is throttled to the power cavity 22 via the channel 17 and the gap between the piston 6 and the valve body 2, the upper surface of the piston 6 is under stress, pushing the piston 6 to move downwards; but the piston 6 moves downwards slowly under the resistance effect of the buffer cavity 21. The moving state at this time is as shown in FIG. 2.

When the valve core 5 moves and is integrated with a lower sealing gasket 11, the third channel 15 is closed; the second channel 14 is communicated with the first channel 13; the high temperature and pressure air passes through the second channel 14, flows to the first channel 13, and enters the evaporator for defrosting. See FIG. 3.

Figure 4:
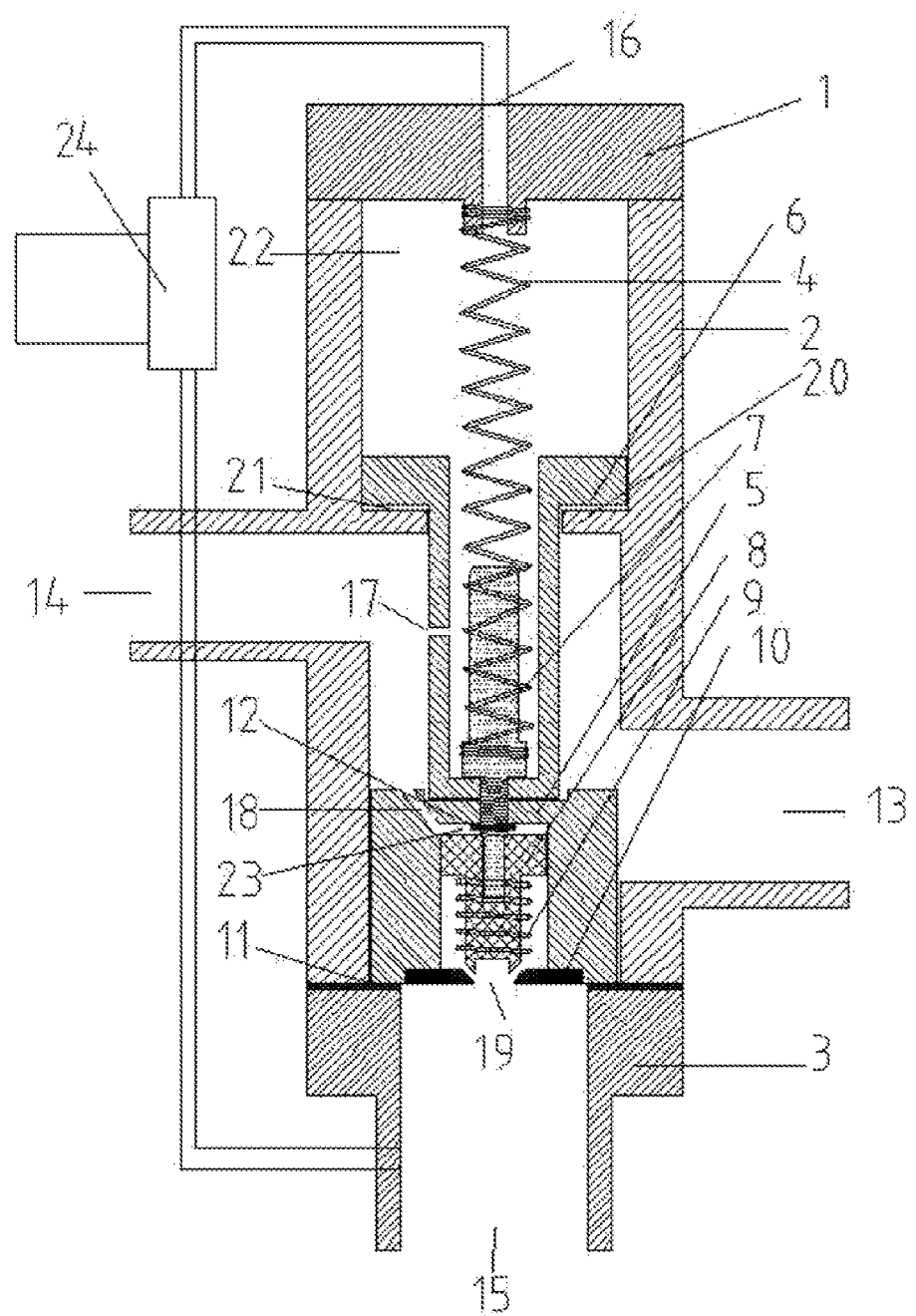
FIG. 4 is a structural schematic diagram when the valve in FIG. 1 is opened.

After the defrosting is completed, the high temperature and pressure air in the second channel 14 disappears; the pressure of the first channel 13 is slowly reduced; when the pressure is reduced to the response pressure of the small valve core 8, the small spring 9 up-springs the small valve core 8; the sixth channel 18 and the seventh channel 19 are opened; the air in the first channel 13 is discharged via the sixth channel 18 and the seventh channel 19 to reduce the pressure; when the pressure is reduced to the response pressure of the valve core 5, the valve core 5 is lifted up under the tensile force of the tension spring 4; the first channel 13 and the third channel 15 are opened; and the evaporator continues the heat absorption operation. The open state diagram of the small valve core is as shown in FIG. 4.

At any time when the lower end of a big valve core 5 is closed, if the forcibly open solenoid valve 24 is opened, then the high pressure air in the power cavity 22 is discharged to the third channel 15 with a low pressure via the fourth channel 16 and the forcibly open solenoid valve 24; the piston 6 moves upwards under the upward pressure of the buffer cavity 21 and the tensile force of the tension spring 4, and drives the valve core 5 to move upwards; in the process of upward moving, the communication between the second channel 14 and the first channel 13 is closed, and the connection between the first channel 13 and the third channel 15 is forcibly opened.

Figure 5:
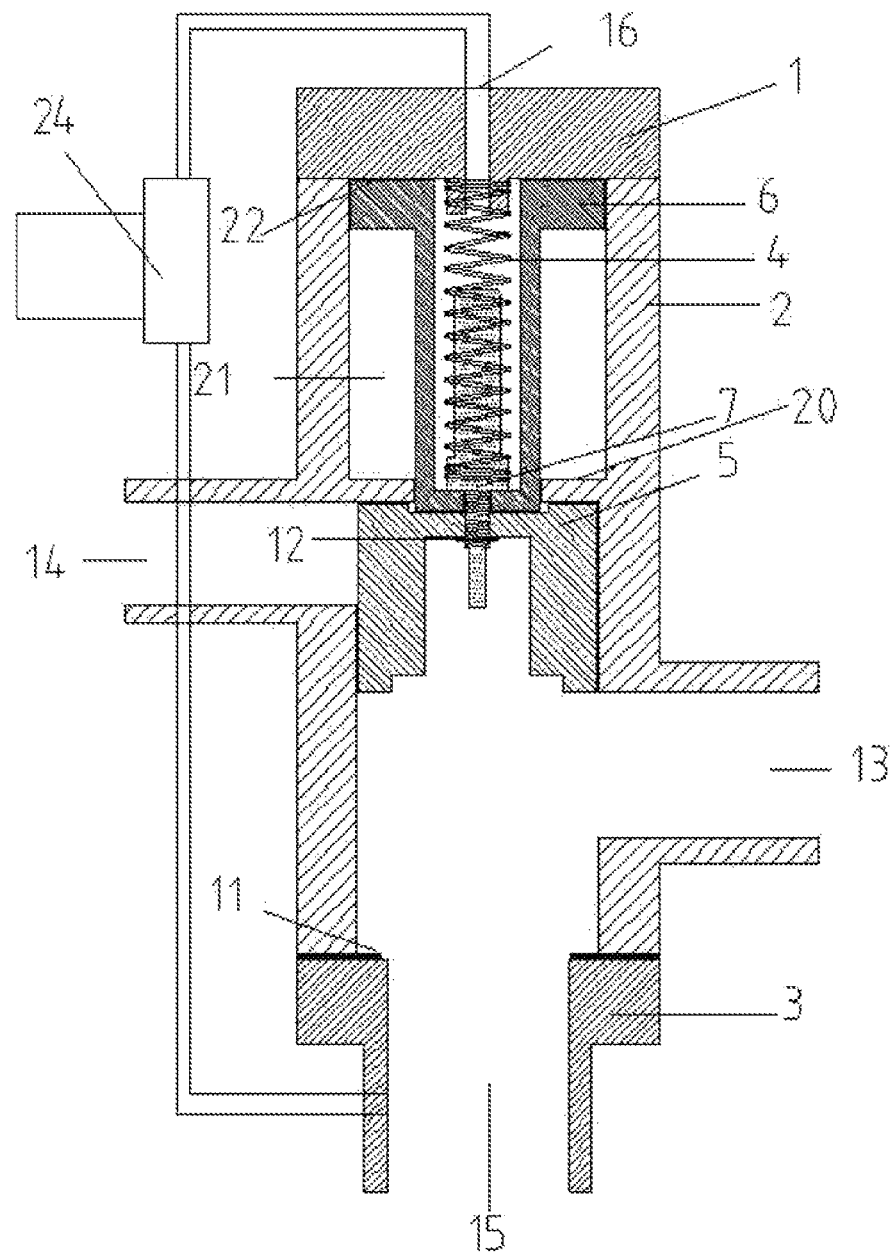
FIG. 5 is a structural schematic diagram of the open state of the second embodiment (having no small valve assemblies) of the present invention.
Figure 6:
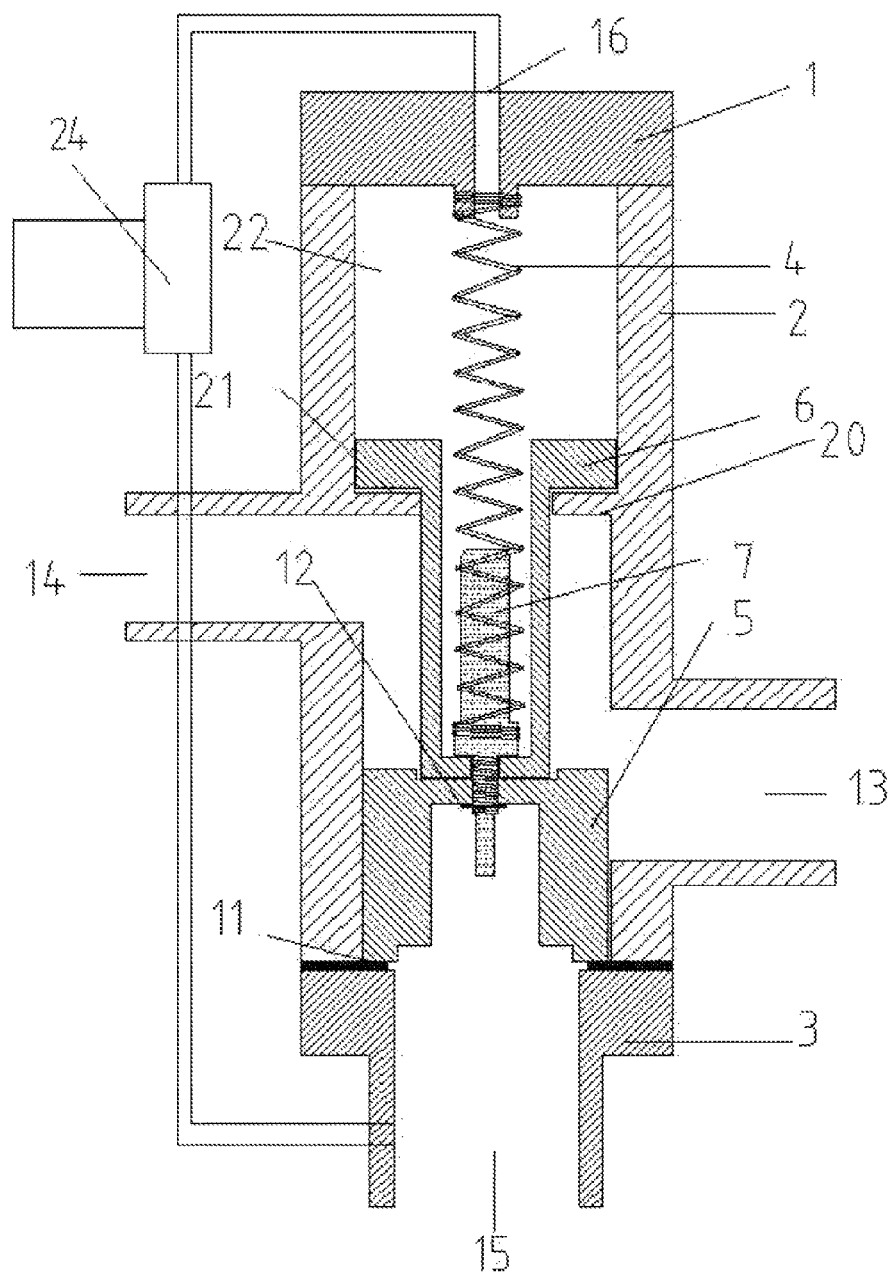
FIG. 6 is a structural schematic diagram of the closed state of the second embodiment (having no small valve assemblies) of the present invention.

Embodiment 2 a large capacity defrosting valve (see FIG. 5-6), having basically the same structure and principle with that of embodiment 1; the differences thereof are: omitting the fifth channel 17 and small valve assemblies, namely having no small valve core 8, small spring 9, small valve cover 10, the sixth channel 18 and the seventh channel 19, but only having a single-stage differential pressure for relieving pressure.

When the high temperature and pressure fluid of the second channel 14 arrives, the air flow is throttled to the buffer cavity 21 via a gap between the piston 6 and the intermediate separator 20; the piston 6 goes upwards under stress to prevent the valve core 5 from moving downwards; after the air flow in the buffer cavity 21 is throttled to the power cavity 22 via the gap between the piston 6 and the valve body 2, the upper surface of the piston 6 is under stress, pushing the piston 6 to move downwards; but the piston 6 moves downwards slowly under the resistance effect of the buffer cavity 21. When the valve core 5 moves and is integrated with the lower sealing gasket 11, the third channel 15 is closed; the second channel 14 is communicated with the first channel 13; the high temperature and pressure air passes through the second channel 14, flows to the first channel 13, and enters the evaporator for defrosting.

After the defrosting is completed, the high temperature and pressure air in the second channel 14 disappears; the pressure of the first channel 13 is slowly reduced; when the pressure is reduced to the response pressure of the valve core 5, the valve core 5 is lifted up under the tensile force of the tension spring 4; the first channel 13 and the third channel 15 are opened; and the evaporator continues the heat absorption operation.

At any time when the lower end of the big valve core 5 is closed, if the forcibly open solenoid valve 24 is opened, then the high pressure air in the power cavity 22 is discharged to the third channel 15 with a low pressure via the fourth channel 16 and the forcibly open solenoid valve 24; the piston 6 moves upwards under the upward pressure of the buffer cavity 21 and the tensile force of the tension spring 4, and drives the valve core 5 to move upwards; in the process of upward moving, the communication between the second channel 14 and the first channel 13 is closed, and the connection between the first channel 13 and the third channel 15 is opened.

Figure 7:
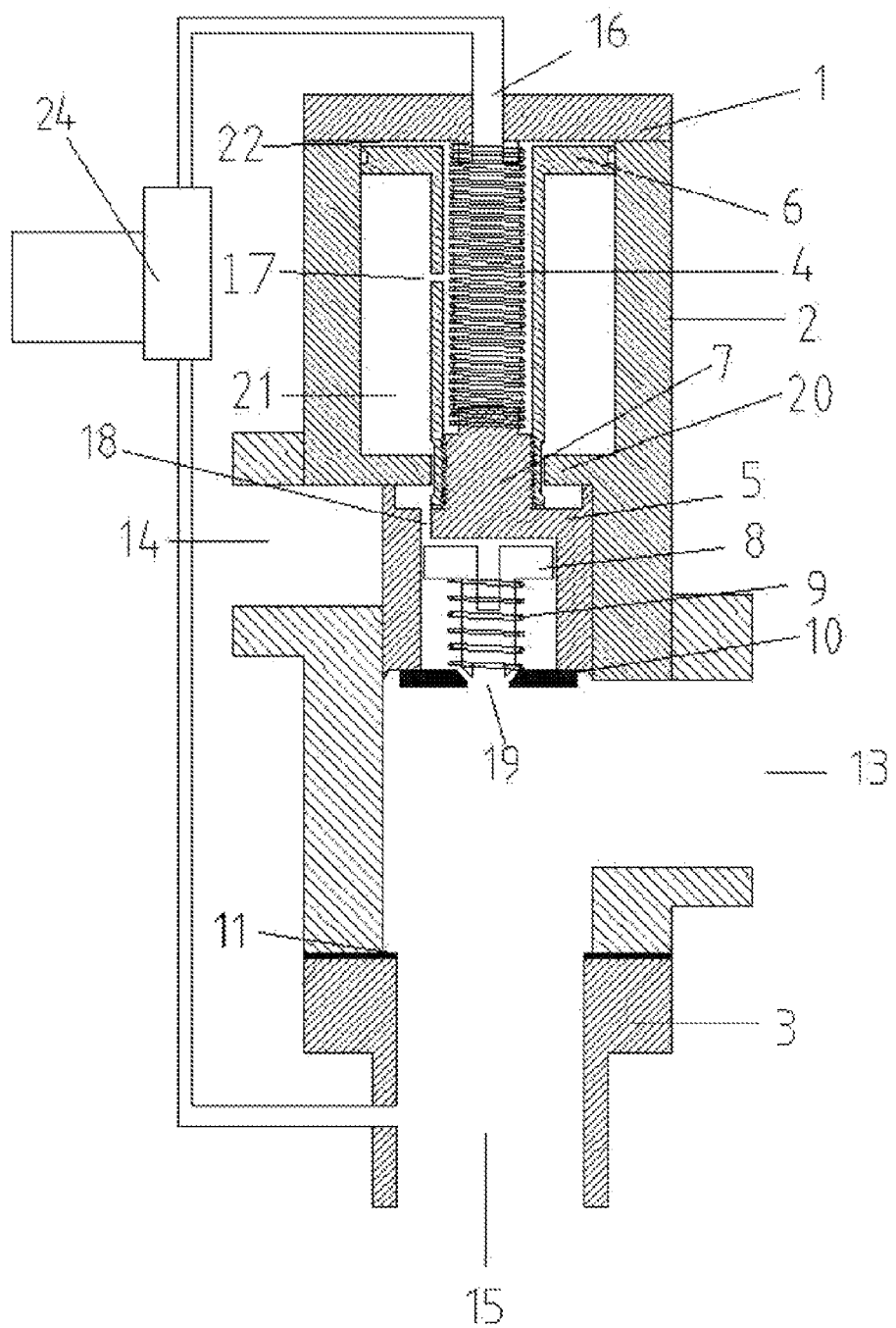
FIG. 7 is a structural schematic diagram of the open state of the third embodiment (the connecting rod and the valve core are integrated) of the present invention.
Figure 8:
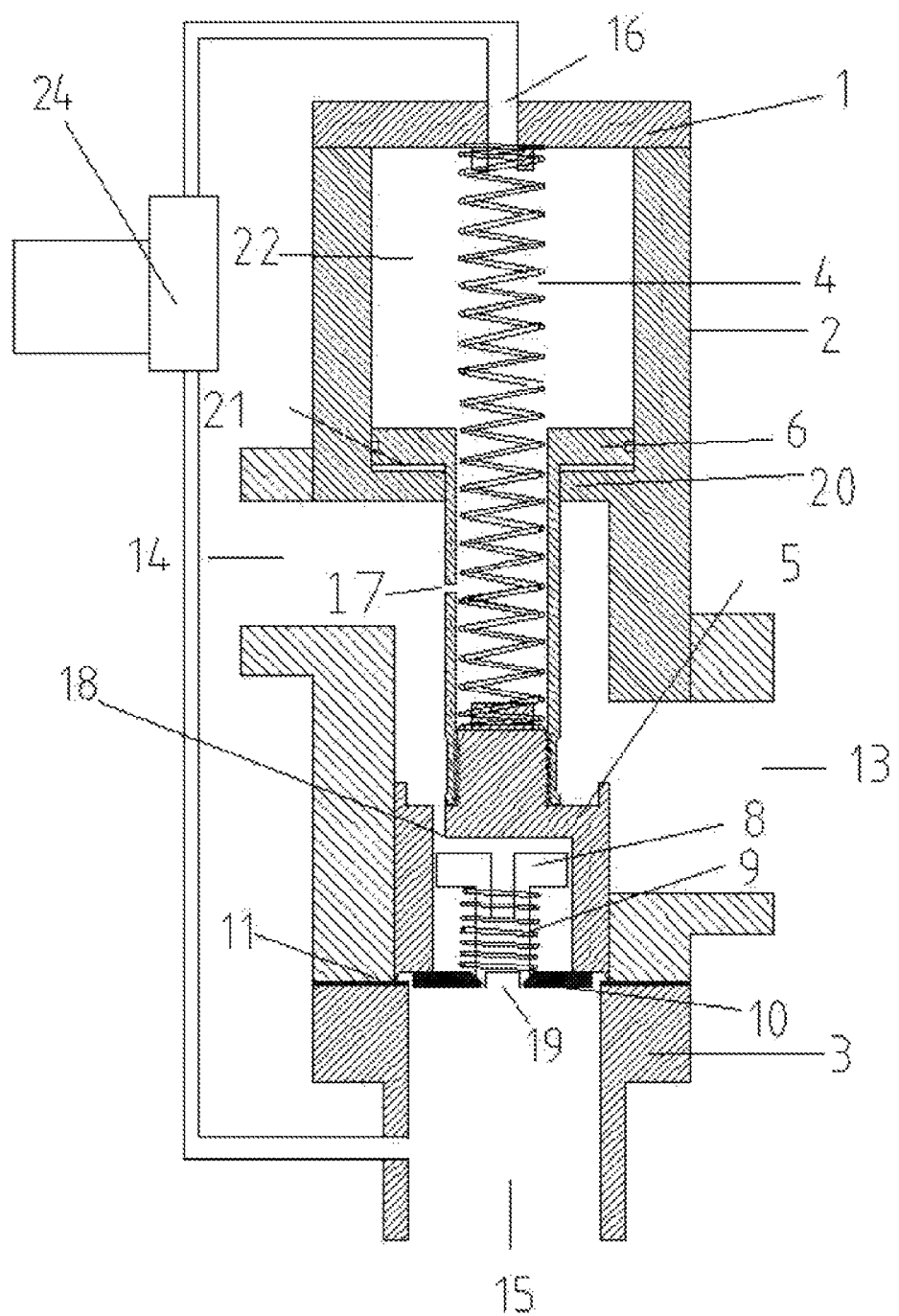
FIG. 8 is a structural schematic diagram of the closed state of the third embodiment (the connecting rod and the valve core are integrated) of the present invention.

Embodiment 3 a large capacity defrosting valve (see FIG. 7-8), having basically the same structure and principle with that of embodiment 1; the differences thereof are: the connecting rod 7 and the valve core 5 are integrated, and the locking pad 12 is omitted, thus reducing the number of the components.

Figure 9:
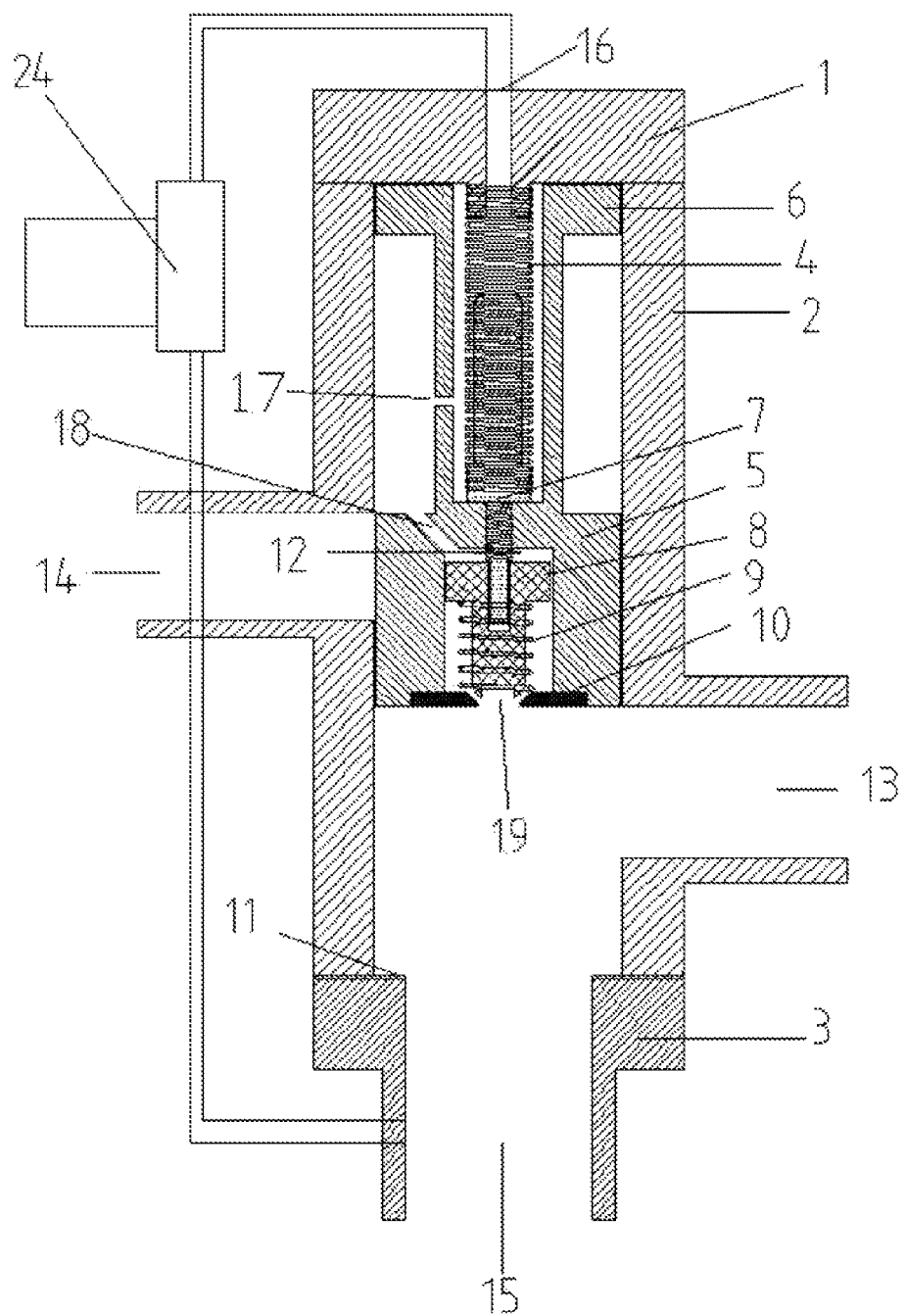
FIG. 9 is a structural schematic diagram of the open state of the fourth embodiment (having no intermediate separator) of the present invention.
Figure 10:
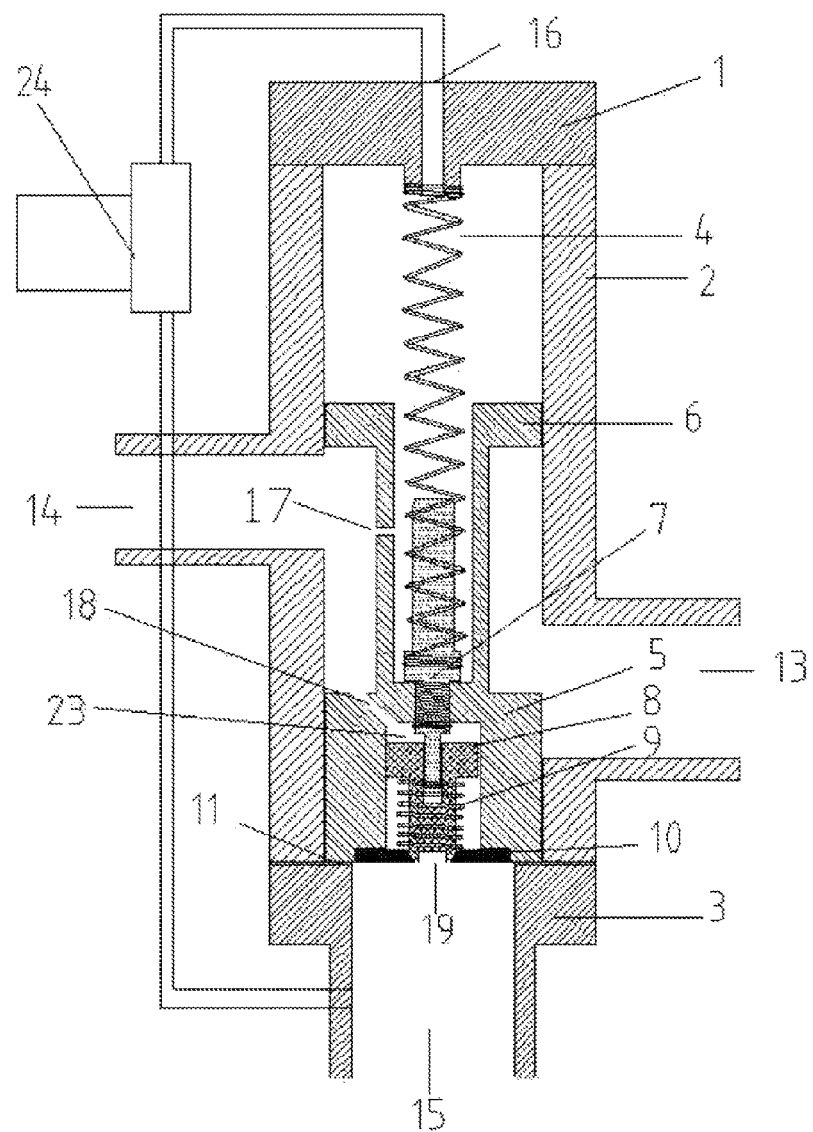
FIG. 10 is a structural schematic diagram of the closed state of the fourth embodiment (having no intermediate separator) of the present invention.

Embodiment 4 a large capacity defrosting valve (see FIG. 9-10), having basically the same structure and principle with that of embodiment 1; the differences thereof are: omitting the intermediate separator 20, reducing the buffer effect. The present embodiment can be used in special occasions having no requirement for vibration.

When the high temperature and pressure fluid of the second channel 14 arrives, the air flow is throttled to the buffer cavity 21 via a gap between the piston 6 and the valve body 2; since no intermediate separator exists (the lower surface of the piston 6 and the upper surface of the valve core 5 are under the stress in opposite directions), the move resistance effect disappears. After the air flow in the buffer cavity 21 is throttled to the power cavity 22 via the channel 17, the upper surface of the piston 6 is under stress, pushing the piston 6 to move downwards. When the valve core 5 moves and is integrated with the lower sealing gasket 11, the third channel 15 is closed; the second channel 14 is communicated with the first channel 13; the high temperature and pressure air passes through the second channel 14, flows to the first channel 13, and enters the evaporator for defrosting.

After the defrosting is completed, the high temperature and pressure air in the second channel 14 disappears; the pressure of the first channel 13 is slowly reduced; when the pressure is reduced to the response pressure of the valve core 5, the valve core 5 is lifted up under the tensile force of the tension spring 4; the first channel 13 and the third channel 15 are opened; and the evaporator continues the heat absorption operation.

At any time when the lower end of the big valve core 5 is closed, if the forcibly open solenoid valve 24 is opened, then the high pressure air in the power cavity 22 is discharged to the third channel 15 with a low pressure via the fourth channel 16 and the forcibly open solenoid valve 24; the piston 6 moves upwards under the effect of the tension spring 4, and drives the valve core 5 to move upwards; in the process of upward moving, the communication between the second channel 14 and the first channel 13 is closed, and the connection between the first channel 13 and the third channel 15 is opened. The present solution reduces the processing difficulty and cost, and is suitable for the occasions having low requirement for impact.

Figure 11:
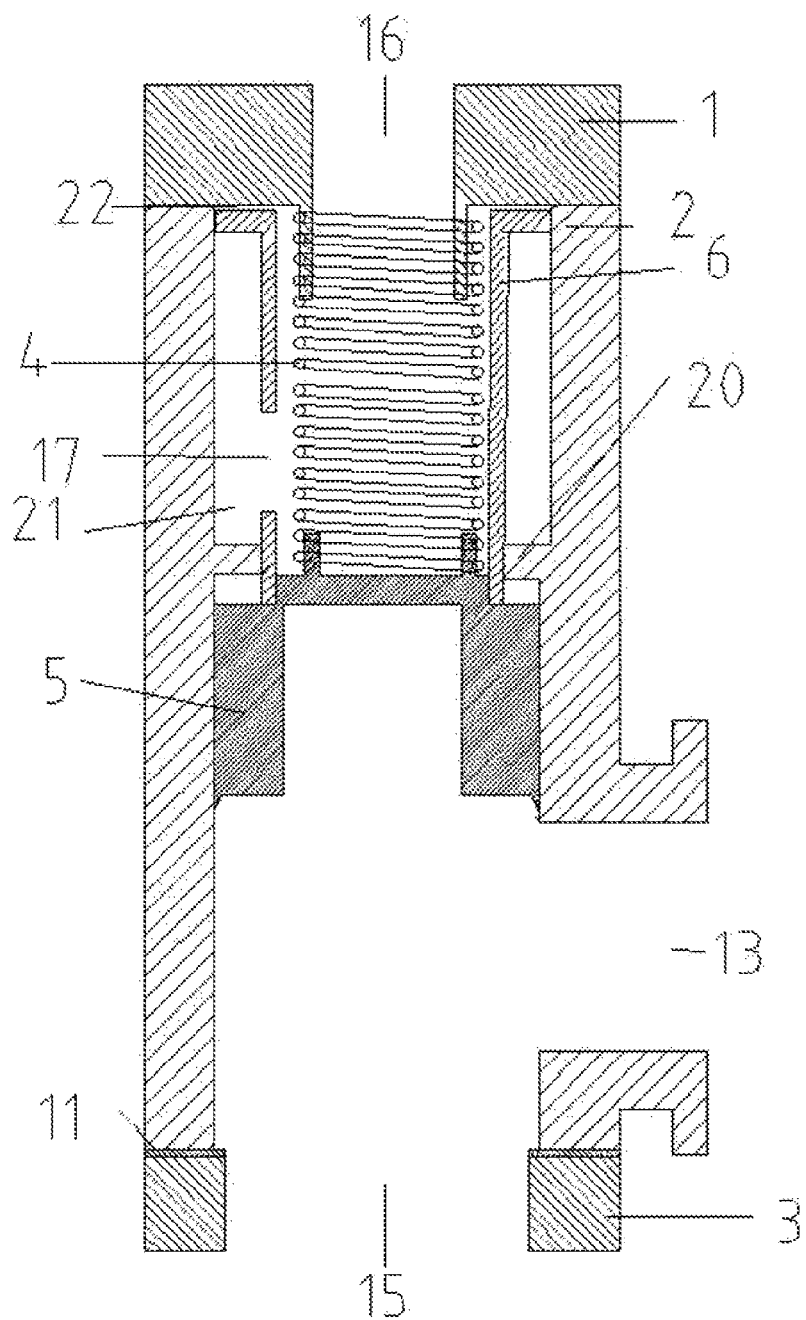
FIG. 11 is a structural schematic diagram of the open state of the fifth embodiment (the second channel 14 is disposed above) of the present invention.
Figure 12:
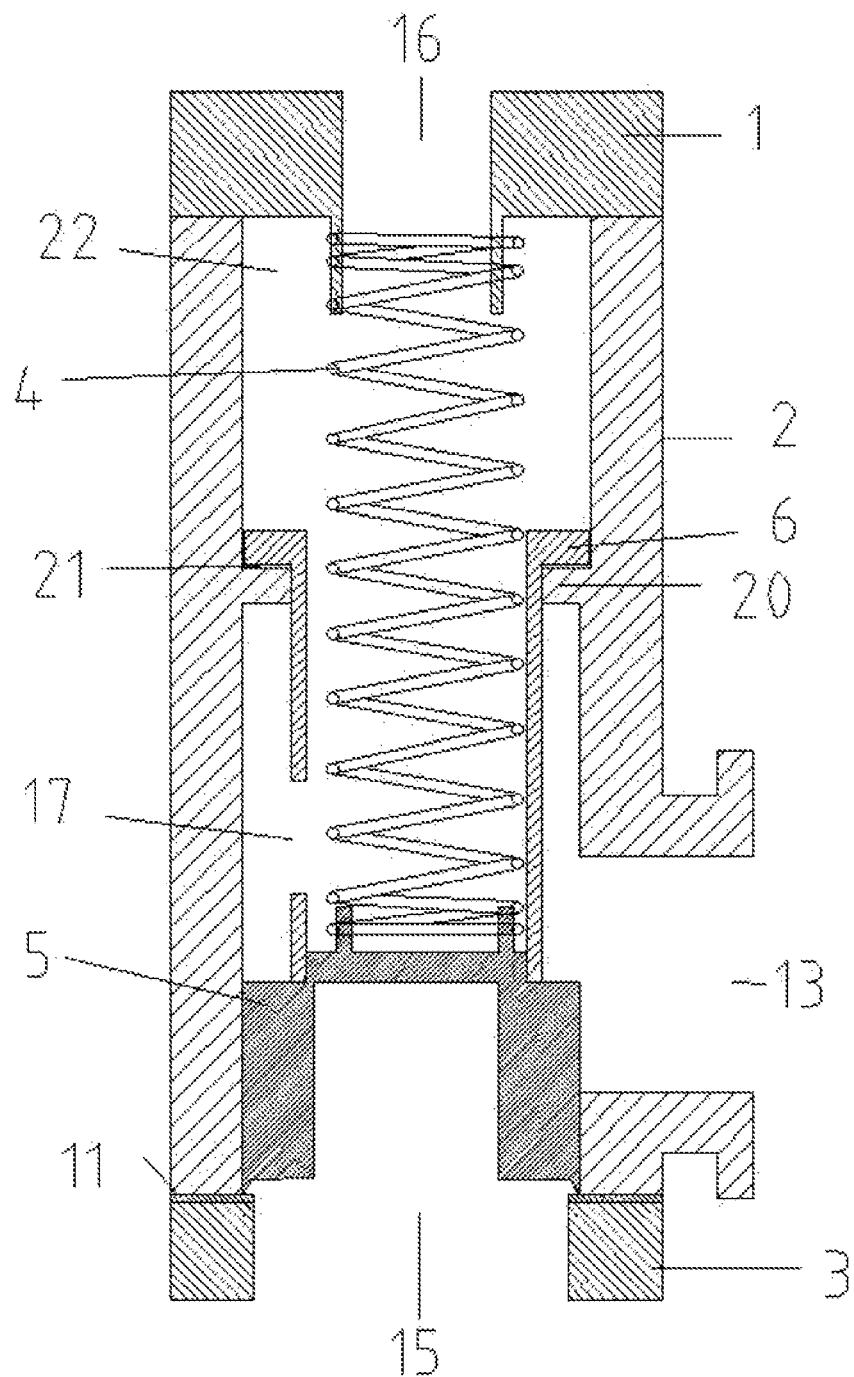
FIG. 12 is a structural schematic diagram of the closed state of the fifth embodiment (the second channel 14 is disposed above) of the present invention.

Embodiment 5 a large capacity defrosting valve (see FIG. 11-12), having basically the same structure and principle with that of embodiment 2; the differences thereof are: the connecting rod 7 and the valve core 5 are integrated; the locking pad 12 is omitted; furthermore, the second channel 14, the forcibly open solenoid valve 24, and the pipe connected to the third channel 15 are omitted. When in use, the fourth channel 16 is connected to the air discharge pipe of the high temperature and pressure air compressor; the fourth channel 16 plays the role of the second channel 14 in embodiment 1. The fifth channel 17 on the piston 6 is widened. The present solution has a simpler structure, saves cost, can be installed at a specific place, and is suitable for the occasions having no requirement for forcible opening.

When the high temperature and pressure fluid of the fourth channel 16 arrives, the upper surface of the piston 6 is under a downward stress under the effect of the high temperature and pressure air coming from the fourth channel 16, pushing the piston 6 and the valve core 5 to move downwards. The high temperature and pressure fluid of the fourth channel 16 also flows to the buffer cavity 21 via the channel 17; the lower surface of the piston 6 is under an upward stress, preventing the valve core 5 from moving downwards, thus, the piston 6 plays a buffer effect. When the valve core 5 moves and is integrated with the lower sealing gasket 11, the third channel 15 is closed; the fourth channel 16 is communicated with the first channel 13 via the widened channel 17; the high temperature and pressure air passes through the first channel 13, and enters the evaporator for defrosting.

After the defrosting is completed, the high temperature and pressure air in the fourth channel 16 disappears; the pressure of the first channel 13 is slowly reduced; when the pressure is reduced to the response pressure of the valve core 5, the valve core 5 is lifted up under the tensile force of the tension spring 4; the first channel 13 and the third channel 15 are opened; and the evaporator continues the heat absorption operation.

If a double-stage differential pressure is required to open the defrosting valve, then the small valve core assemblies such as the small valve core 8, the small spring 9, the small valve cover 10, the sixth channel 18 and the seventh channel 19 can be added according to embodiment 1.

Figure 15:
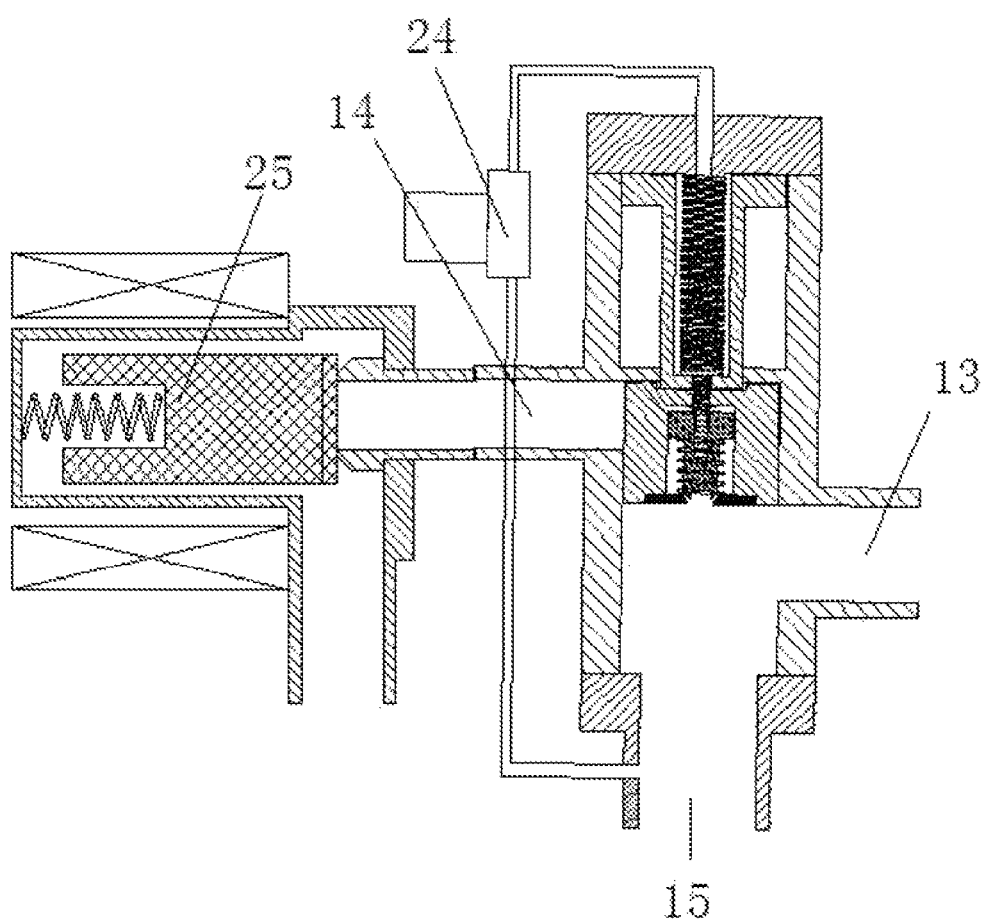
FIG. 15 is a structural schematic diagram of the sixth embodiment of the present invention.

Embodiment 6 a large capacity defrosting valve (see FIG. 15), having basically the same structure and principle with that of embodiment 1; the differences thereof are: the second channel 14 is connected, to a defrosting solenoid valve 25, such that the present defrosting valve becomes a valve group integrated with the forcibly open solenoid valve 24 and the defrosting solenoid valve 25, thus having a compact structure and low cost.

Figure 13:
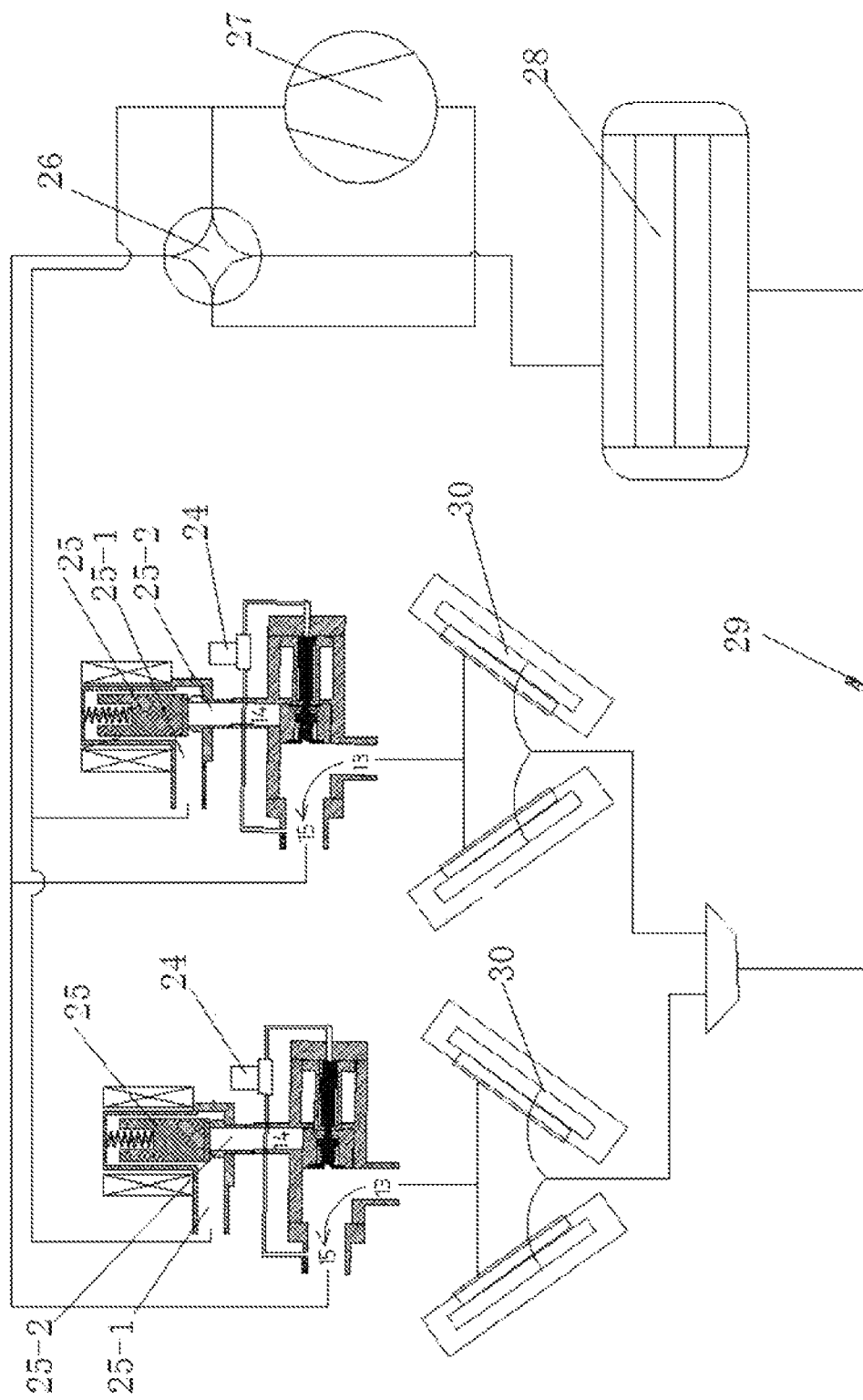
FIG. 13 is a diagram showing the normal heating state of an air-conditioner in which the present invention is applied.

The schematic diagram of the defrosting valve of the invention when the air-conditioner is heating is as shown in FIG. 13. And the schematic diagram of the defrosting valve of the invention when performing sectional defrosting is as shown in FIG. 14.

When the air-conditioner is heating, as shown in FIG. 13, the valve group defrosting solenoid valve 25 does not operate; the second channel 14 has no high temperature and pressure air therein, thus the defrosting valve does not operate; a refrigerant from the condenser 28 enters the evaporator 30 via an expansion valve 29 for evaporating and absorbing heat, then flows out of the evaporator 30, and flows back to the compressor 27 via the first channel 13 of the defrosting valve, the third channel 15 of the defrosting valve, and the four-way valve 26.

Figure 14:
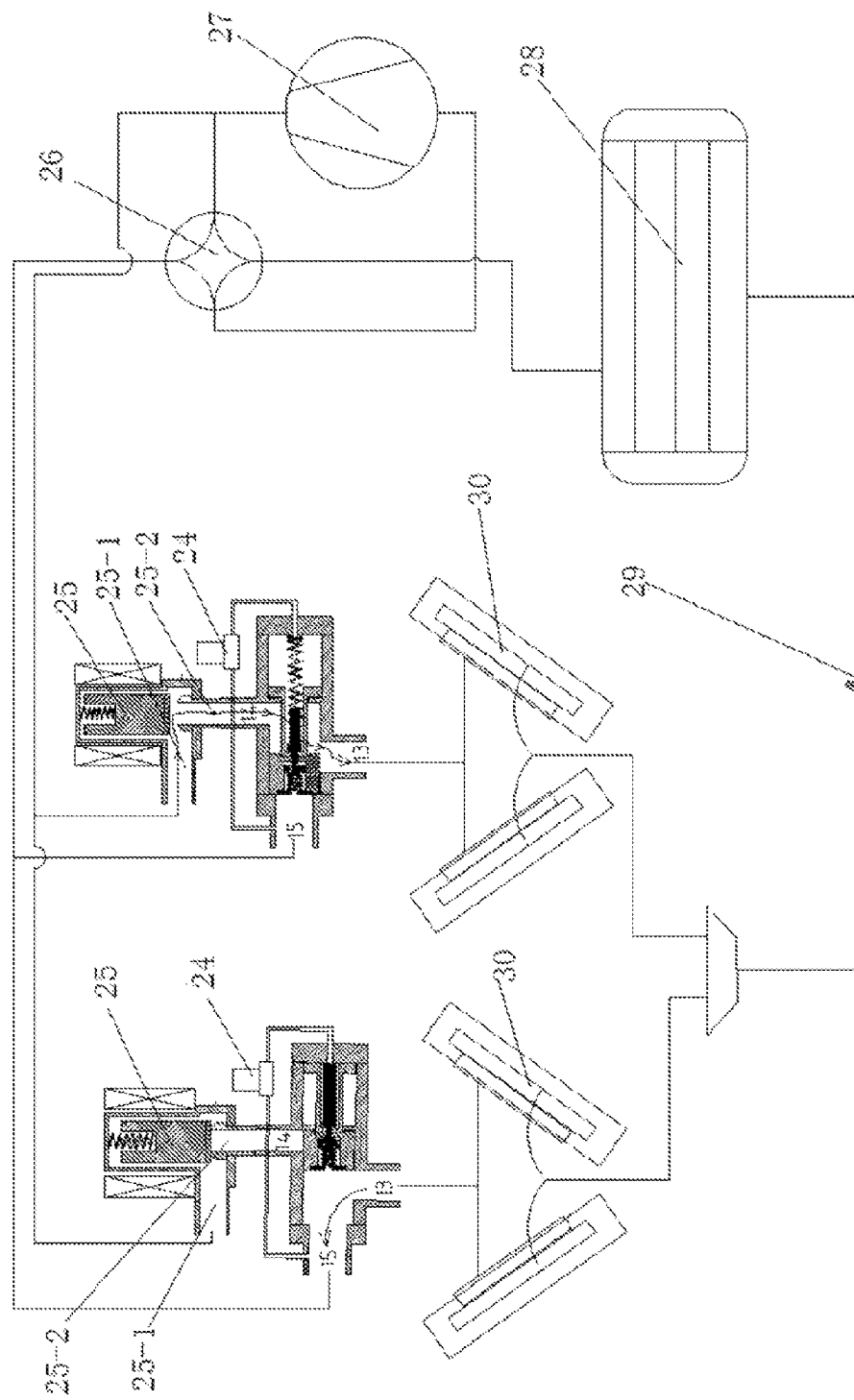
FIG. 14 is a diagram showing the sectional defrosting state of an air-conditioner in which the present invention is applied.

When the evaporator of an air-conditioner is frosted and required to be defrosted, as shown in FIG. 14, one of the defrosting solenoid valve 25 is opened; the high temperature and pressure air coming from the compressor 27 enters the second channel 14 of the defrosting valve; the piston 6 in the defrosting valve drives the valve core 5 to move, until the third channel 15 is closed, and the second channel 14 is communicated with the, first channel 13; the high temperature and pressure air passes through the channels 25-1 and 25-2 of the defrosting solenoid valve 25, then the second channel 14 and the first channel 13 of the defrosting valve, and finally arrives at the evaporator 30 to heat and defrost the evaporator 30. After the defrosting is completed, the defrosting solenoid valve 25 is closed; the high temperature and pressure air in the second channel 14 disappears; the pressure of the evaporator 30 is reduced; when the pressure is reduced to a certain value, the small valve core 8 is separated from the small valve cover 10 under the effect of the small spring 9; the refrigerant relieves pressure via the sixth channel 18 and the seventh channel 19. When the pressure is further reduced, under the effect of the tension spring 4, the piston 6 drives the valve core 5 to move to the original position; the second channel 14 is closed; the first channel 13 is communicated with the third channel 15; and the evaporator 30 continues to operate.

During the period the defrosting valve loses the third channel 15, if the defrosting valve is required to be forcibly opened, then the forcibly open solenoid valve 24 operates; the high pressure air at the upper end of the piston 6 is discharged into the third channel 15 via the forcibly open solenoid valve 24; the pressure of the piston 6 disappears; under the effect of the tension spring 4, the piston 6 and the valve core 5 move to the original positions; the second channel 14 is forcibly closed; and the connection between the first channel 13 and the third channel 15 is opened.

If another evaporator is required to be defrosted, then nothing requires but to open the defrosting solenoid valve of another defrosting valve.

The embodiments above are only the preferred embodiments of the present invention, but not intended to restrict the scope of the present invention. Under the premise without deviating from the design spirit of the present invention, any variations and improvements made to the technical solution of the present invention by an ordinary person skilled in the art, shall be all concluded in the protection scope defined by the claims of the present invention.

I claim:

1. A large capacity defrosting valve, characterized by comprising a valve body; the upper end of the valve body is connected to an upper end cover; the valve body is provided with a piston therein; the piston is connected to a valve core; the upper end of the valve core is connected to a tension spring; the upper end of the tension spring is connected to the lower end of the upper end cover; the lower end of the valve body is connected to a lower end cover; the valve body is provided with a first channel and a second channel thereon; the lower end cover is provided with a third channel thereon; the upper end cover is provided with a fourth channel thereon; a power cavity is formed between the piston and the upper end cover, and a buffer cavity is formed between the piston and the valve body.

2. The large capacity defrosting valve according to claim 1, characterized in that the valve core is provided with a small valve cover at the lower end of the valve core, and a small valve core therein; the lower part of the small valve core is sleeved with a small spring for jacking up the small valve core; the lower end of the small spring is connected to the small valve cover; and the small valve cover is provided with a channel thereon.

3. The large capacity defrosting valve according to claim 1, characterized in that the piston is connected to the valve core via a connecting rod; and the connecting rod is connected to the tension spring.

4. The large capacity defrosting valve according to claim 3, characterized in that the piston is connected to the valve core via the connecting rod, and is locked by a locking pad.

5. The large capacity defrosting valve according to claim 1, characterized in that the piston is provided with a fifth channel thereon.

6. The large capacity defrosting valve according to claim 1, characterized in that the valve core is provided with a sixth channel at the upper end of the valve core.

7. The large capacity defrosting valve according to claim 1, characterized in that the fourth channel is connected to a forcibly open solenoid valve via a fist pipe; and the forcibly open solenoid valve is connected to the third channel via a second pipe.

8. The large capacity defrosting valve according to claim 1, characterized in that the second channel is connected to a defrosting solenoid valve.

9. The large capacity defrosting valve according to claim 1, characterized in that a sealing gasket is disposed between the valve body and the lower end cover.

* * * * *